W. J. HOLLIER.
MACHINE FOR DECORTICATING FLAX.
APPLICATION FILED DEC. 12, 1910.
1,023,152.
Patented Apr. 16, 1912.
4 SHEETS—SHEET 4.
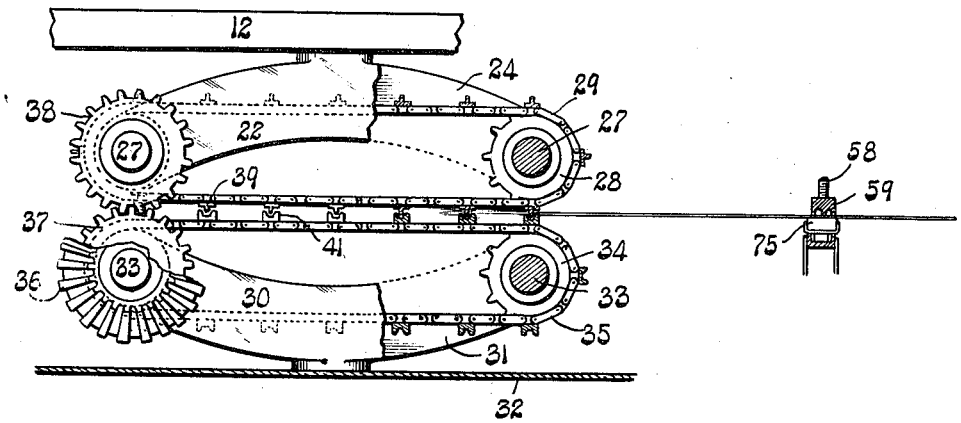
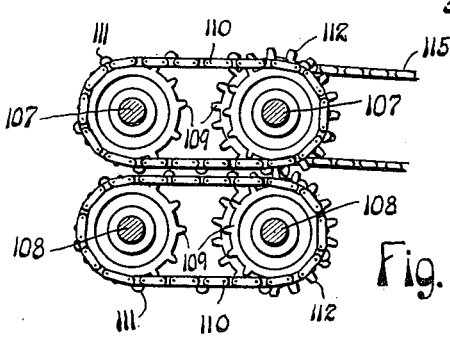
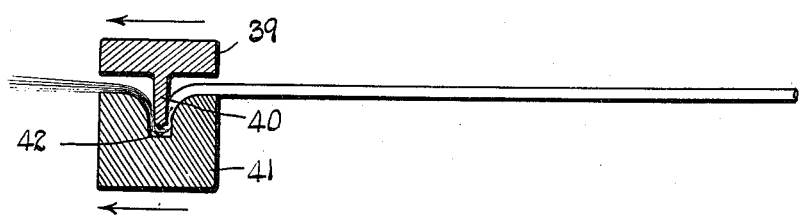
Attest
a. J. McCauley
Stella Hill
Inventor:
Walter J. Hollier
by Bruce A. Eliott
Att'y

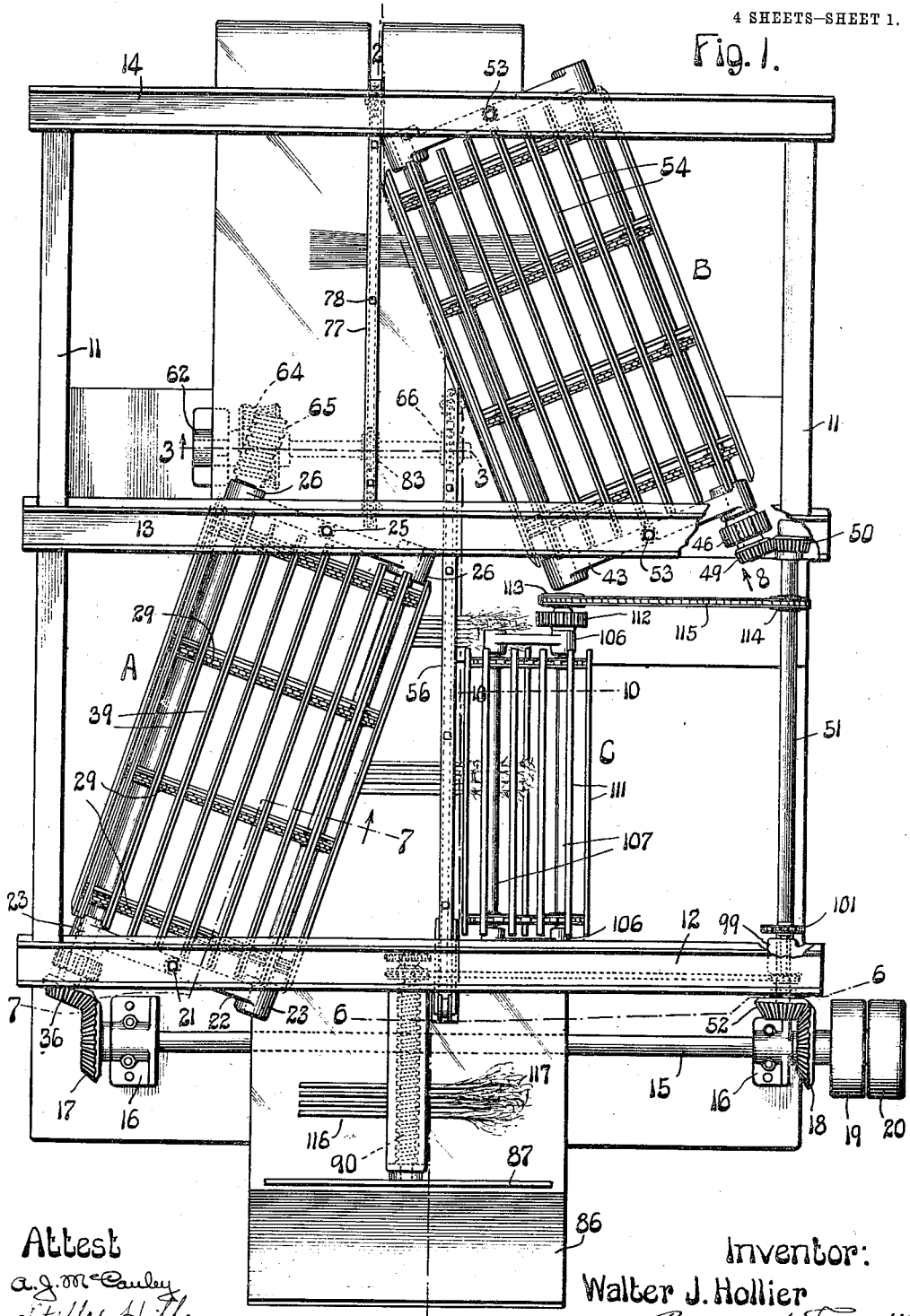

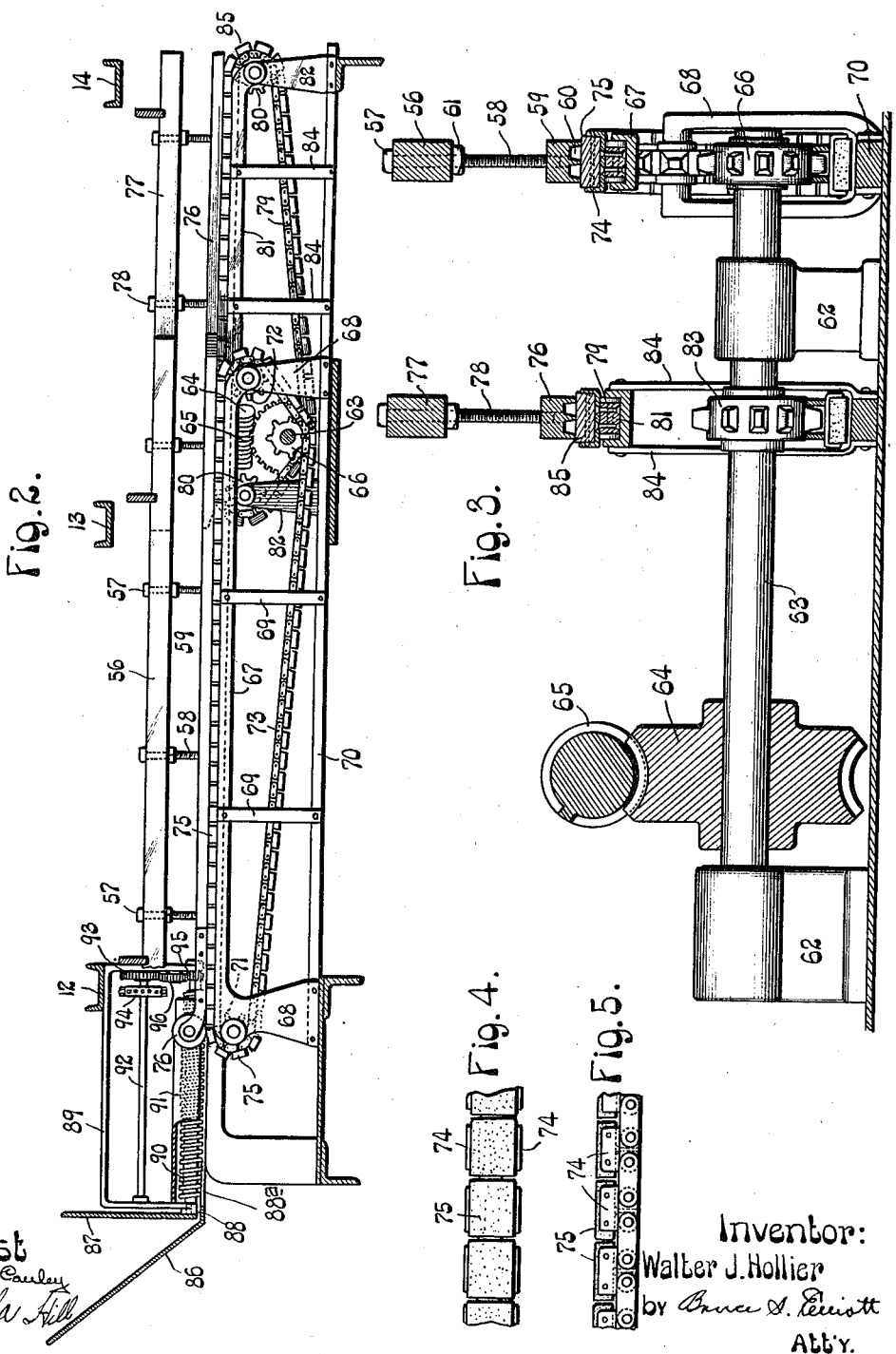

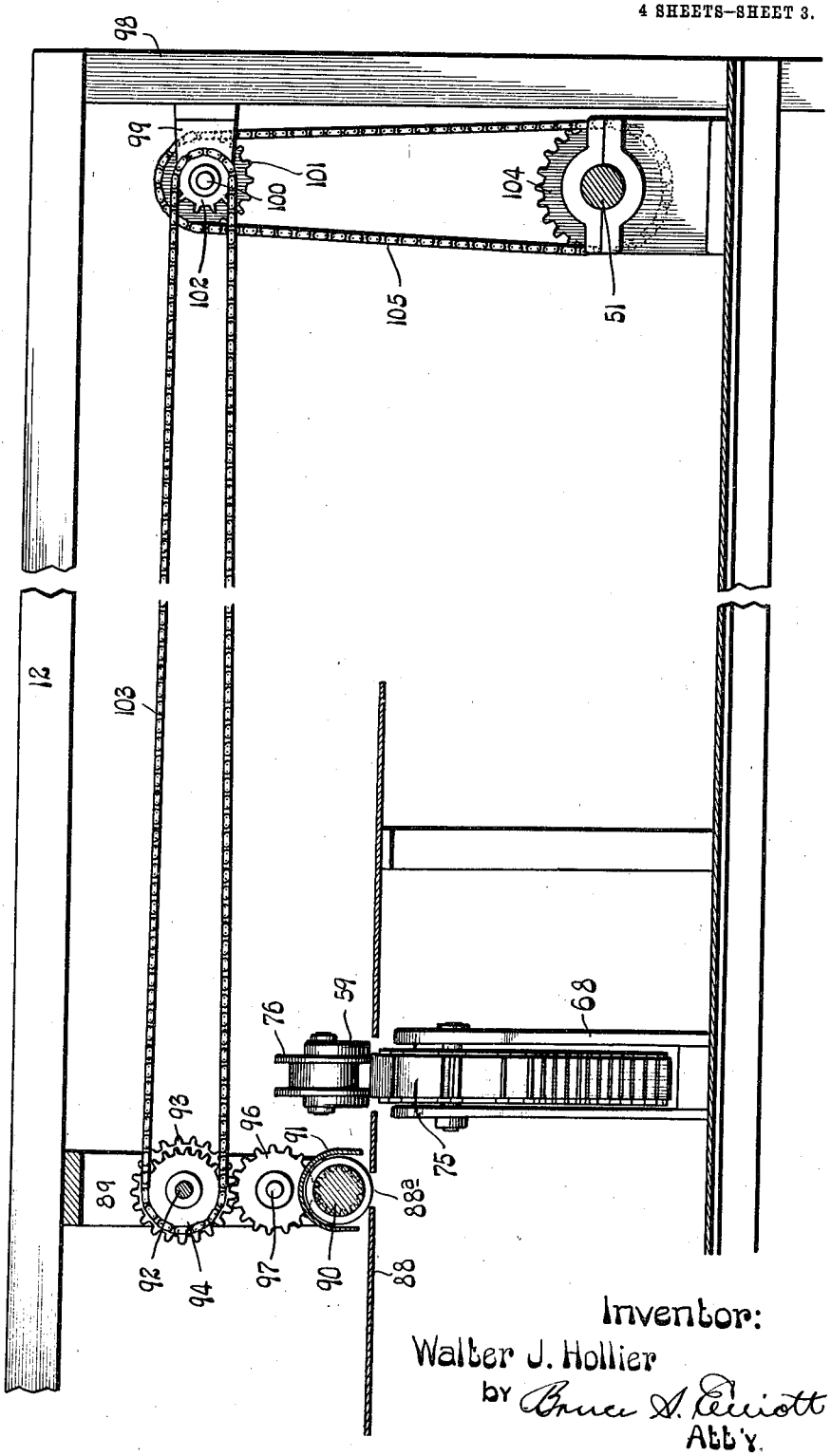

UNITED STATES PATENT OFFICE.

WALTER J. HOLLIER, OF ST. LOUIS, MISSOURI, ASSIGNOR OF ONE-HALF TO ROBERT H. McCORD, OF KANSAS CITY, MISSOURI.

MACHINE FOR DECORTICATING FLAX.

1,023,152.   Specification of Letters Patent.   Patented Apr. 16, 1912.

Application filed December 12, 1910. Serial No. 596,868.

*To all whom it may concern:*

Be it known that I, WALTER J. HOLLIER, a British subject, at present residing in the city of St. Louis and State of Missouri, have invented new and useful Improvements in Machines for Decorticating Flax, of which the following is a specification.

This invention relates to a novel machine for decorticating fibrous plants of either the leaf or stalk variety, including under the leaf plants, manila and all plants of the aloe and agave families, and under the stalk variety, ramie, hemp, jute and flax. In the embodiment of the invention, as illustrated in the accompanying drawings, I aim to provide more particularly for the treatment of flax; but the principle of the invention may be equally well applied to the treatment of all characters of fibrous plants, as indicated above, necessitating only such changes in form or proportion as may be required by the nature or size of the plant. Throughout the United States flax is very generally grown for the seed, and it is not usual to attempt to recover the fiber from the stalk, as, when the plant is allowed to seed, the stalk becomes relatively dry and tough, and it is a matter of considerable difficulty to recover the fiber in a manner or in quantities commercially practicable. Especially is this true as respects the flax straw after it has been threshed, which operation results in so tangling and breaking the straw as to make it extremely difficult to do anything at all with it, and usually it is burned. Under any circumstances, however, the fiber is only recovered in the form of tow.

So far as I am aware, aside from the present invention, there is no machine known which can be successfully used for recovering long line fiber from flax of any description, that is to say, whether harvested while green or after going to seed. Attempts have been made heretofore with various types of machines to decorticate flax for the recovery of long line fiber, but all such attempts have been commercial failures, both in respect to the amount of fiber recovered and the amount of husk or vegetable matter removed. This statement is made on the basis of recent investigation, and as the result of a wide experience and many years of intimate connection with the art. I claim to have overcome the obstacles which have heretofore baffled the attempts of inventors in this regard; and in order to give a general understanding of the advantages to be derived from the employment of my invention, I will briefly state at this point that by the principle of operation I employ in the treatment of flax the outer husk or vegetable matter is crushed and gently brushed or rubbed from about the fiber, and at the same time without breaking the fibers. I have demonstrated on a full sized machine, from which the accompanying drawings were made, that after the flax has passed through the machine practically the entire amount of fiber is recovered as long line fiber, and the same is almost perfectly clean. The loss of fiber under the most adverse conditions has practically never exceeded two per cent.

A feature of importance in the invention is the fact that I combine with the decorticating apparatus a threshing machine which removes the heads and seeds from the flax without interfering with its passage through the decorticating device. In this way I am able to recover both the seed and the fiber from the flax. In European countries it is usual to harvest the flax before it has gone to seed; or, at least, before the seeds have fully matured. My machine is equally adapted for the treatment of such flax, under which circumstances the threshing attachment may, if desired, be removed.

The invention, in a broad aspect, may be considered to consist of pairs of complemental sets of traveling bars having an interlocking, or inter-engaging, relation, whereby as the flax is passed progressively between the traveling bars the stalk, as a whole, is bent back and forth, crushing the husk, or outer vegetable covering, and permitting the traveling bars to brush the loosened material from about the fiber.

A structural feature of importance consists in locating the decorticating members so that one is in advance of the other, whereby I secure economy of material, certainty in operation, and lightness and simplicity of construction. Such arrangement, furthermore enables me to combine with the machine, in a manner to operate simultaneously therewith, a threshing attachment, this important adjunct permitting me to recover the seed, and at the same time to place the branch ends of the flax in better condition to be acted on by the decorticating mechanism.

The above features of the invention, as well as the principle of operation employed, will be more fully understood in the following detailed description, in connection with the accompanying drawings, in which latter:

Figure 1 is a plan view of the machine; Fig. 2 is a transverse sectional view, throughout the entire length of the machine, taken on the line 2—2 of Fig. 1; Fig. 3 is a sectional view, on an enlarged scale, taken on the line 3—3 of Fig. 1; Fig. 4 is a plan view, enlarged, showing a section of the movable member of the combined holder and carrier; Fig. 5 is a view in side elevation of the same; Fig. 6 is a cross sectional view, on an enlarged scale, at the front of the machine, taken on the line 6—6 of Fig 1; Fig. 7 is a view partly in end elevation and partly in section of the forward decorticating member, the view being on an enlarged scale and taken on the irregular line 7—7 of Fig. 1, and including a detached sectional view of the combined holder and carrier; Fig. 8 is a broken detail view, on an enlarged scale, of the rear decorticating member, the same being shown in end elevation, and being viewed in the direction of the arrow 8 of Fig. 1; Fig. 9 is a sectional view through two complemental bars of the decorticating members, the view being on an enlarged scale and illustrating the manner in which the material is acted upon by said bars in operation; and Fig. 10 is a sectional view, on an enlarged scale, taken on the line 10—10 of Fig. 1, to better illustrate the threshing device.

Referring now to the drawings, the frame of the machine is supported on standards in the usual or any preferred way, and comprises longitudinal frame members 11, and transverse beams 12, 13 and 14. Extending across the front of the machine is a main drive shaft 15, mounted in suitable bearings 16, and having mounted thereon bevel gears 17 and 18. On one end the shaft 15 is provided with a loose pulley 19, and a fast pulley 20. Bolted to the under side of the cross beam 12, as indicated at 21, is an arched head 22 provided at opposite ends with bearings 23. A similar head 24 is bolted to the under side of the cross beam 13, as indicated at 25, and is provided at its opposite ends with bearings 26, which are in alinement with the bearings 23. Mounted in the respective bearings 23 and 26 are shafts 27, on each of which is mounted, at equal distances apart, four sprocket wheels 28, a sprocket chain 29 being mounted on each corresponding pair of sprocket wheels 28. Beneath the heads 22 and 24 are located corresponding reversely arched heads 30 and 31, which are bolted to and supported upon suitable frame members, as indicated at 32 (see Fig. 7). The arched heads 30 and 31 are also provided at their ends with bearings (not shown) similar to the corresponding bearings 23 and 26 of the upper heads, and in these bearings are mounted shafts 33, each of which, in the same manner as described in reference to the shafts 27, is provided with sprocket wheels 34, on corresponding pairs of which are mounted sprocket chains 35. The four shafts, 27 and 33, are revolubly mounted in their bearings, and the outer shaft 33 has secured on its forward end a bevel gear 36 which meshes with the bevel gear 17 of the drive shaft 15. Said shaft 33 has likewise secured thereto, adjacent to the bevel gear 36, a gear wheel 37 which is in mesh with a corresponding gear wheel 38 secured on the outer end of the corresponding shaft 27 of the upper head. The distance between the centers of the inner shafts 27 and 33 is somewhat less than the distance between the center of the outer shafts 27 and 33 so that the chains 29 and 35 bear a slightly diverging relation to each other, the purpose of which arrangement will presently appear. Mounted in parallel relation on the sprocket chains 29, and fixedly secured thereto so as to move therewith, are a series of T-shaped bars 39, shown in section on an enlarged scale in Fig. 9, each of said bars having a centrally-disposed, longitudinally-extending and outwardly-projecting tongue 40. Mounted on and secured to the sprocket chains 35 so as to move therewith, are a series of parallel bars 41 complemental to the bars 39, and each of which is provided with a central longitudinal groove 42, which is adapted to receive the tongue of the corresponding bar 39. The relative arrangement of the parts is such, however, that while the tongues 40 of the bars 39 will enter the grooves 42 of the corresponding bars 41, they will not come in contact with the bottom or sides of said grooves.

It will be understood from the above description that as the shaft 15 revolves, the engagement of the bevel gears 17 and 36 will cause, through the medium of the connection described, the two sets of sprocket chains 29 and 35 to travel in unison, and that as a result the various tongues 40 of the upper series of bars will successively enter the grooves 42 of the lower series of bars; and as the chains travel between the heads in approximately parallel relation it follows that a number of the respective sets of bars will be in interlocked relation at the same time.

The device just described constitutes one of the decorticating devices, which I have indicated generally by A, and will hereinafter be referred to as the "forward decorticator." It will be noted that the longitudinal axis of this forward decorticator forms an acute angle with the longitudinal median line of the machine proper, and that the inner side of the rear end of the forward decorticator terminates substantially at the said median line of the machine.

The rear decorticator B is constructed in exactly the same way as the forward decorticator, and a detailed description thereof is, therefore, unnecessary. A portion of the front heads 43 and 44 are shown in Fig. 8. On the upper outer shaft 45 of the rear decorticator is secured a gear wheel 46, which is in mesh with a gear wheel 47, mounted on the lower outer shaft 48 of the lower head. Secured on this shaft 48 is also a bevel gear 49 which meshes with a corresponding bevel gear 50 mounted on the end of a longitudinal shaft 51, which at its opposite end is provided with a bevel gear 52 in mesh with the bevel gear 18 of the drive shaft. The rear decorticator is supported on the under side of the cross beams 13 and 14, its upper heads being bolted thereto, as indicated at 53. The decorticator B is oppositely inclined with respect to the forward decorticator; its front end projects a slight distance forward beyond the rear end of the forward decorticator, and the rear portion thereof crosses the longitudinal median line of the machine. The upper and lower sets of traveling bars of the decorticator B are in all respects similar in construction to the corresponding bars 39 and 41 of the decorticator A, and for clearness of description they are indicated, respectively, by the numerals 54 and 55. These bars are caused to travel in unison from the drive shaft by the engagement of the bevel gears 49 and 50, and the straight gears 46 and 47.

I will now proceed to describe the means for feeding the flax to the decorticating devices.

Extending longitudinally of the machine, and located a little to the right of the center, as shown in Fig. 1, is a supporting bar 56, suitably connected to the frame work of the machine, and which is provided at intervals with a series of bolts 57, having lower screw-threaded end portions 58, which have screw-threaded engagement with the top of a longitudinal feed bar 59, provided on its under side with a series of longitudinal grooves 60. Each of the bolts 57 is provided with a lock-nut 61 so that when the bolts 57 have been turned to adjust the feed bar 59 in the proper position, it may be held in such position by turning the lock-nuts 61 up against the under side of the supporting bar 56. At the rear of the decorticator A there is mounted in suitable bearings 62 a transversely disposed shaft 63, having secured thereon a worm gear 64, with which gears a worm 65, provided on an extension of the lower outer shaft 33 of the forward decorticator. On the inner end of the shaft 63 there is secured a sprocket wheel 66.

67 indicates a race-way which is provided at its ends with depending portions 68 forming supports, and is likewise suitably supported at suitable intervals throughout its length by vertical supporting members 69, which at their lower ends are secured to a longitudinally extending frame member 70. At opposite ends of the race-way 67 there are mounted idler sprockets 71 and 72. A sprocket chain 73 passes around the idler sprockets 71 and 72, and the driving sprocket wheel 66. The sprocket wheel 66 is driven from the shaft 63 through the medium of the worm gearing 64 and 65, which, in turn, are driven from the shaft 33 of the forward decorticator. The race-way 67 causes the sprocket chain 73 to travel in exact parallel relation with the feed bar 59, and any slight variations may be overcome by adjusting the bolts 57, as before described. Referring to Figs. 4 and 5, each clip connecting two links of the sprocket chain 73 is provided with a metal housing 74 in which is secured a block of leather or like material 75, the outer faces of which blocks, in the travel of the chain 73, are caused to move in more or less close contact with the under grooved side of the feed bar 59. The forward end of the feed bar 59 is curved upwardly slightly, as shown in Fig. 2, and has mounted in its end a grooved roller 76 (see Fig. 6) which is for the purpose of facilitating the passage of the flax between the feed bar 59 and the blocks of leather 75. The feeding mechanism, comprised by the feed bar 59 and the sprocket chain 73, extends from the front of the machine to a point closely adjacent to the inner working side of the rear decorticator at a point about midway the ends thereof. To the left (shown in Fig. 1) of the feeding mechanism just described is a second similar feeding mechanism, the feed bar 76 of which is adjustably mounted from a longitudinal support 77 by threaded bolts 78 in the same manner as described in reference to the preceding mechanism, and the sprocket chain 79 of which passes around idler pulleys 80 mounted at opposite ends of a race-way 81, supported by standards 82 on the frame of the machine, said chain also passing around a sprocket wheel 83 which is fast on the shaft 63. The race-way 81 is supported on the frame member 70 by uprights 84. The leather blocks 85 of the sprocket chain 79 are secured thereon in the same way as has already been described in reference to the sprocket chain 73, and said leather blocks move over the race-way 81 in contact with the under side of the feed bar 76, which is grooved in the same manner as the feed bar 59.

At the front of the machine there is provided a trough 86 and a guard 87, the bottom of which is located a sufficient distance above the bottom of the trough 86 to insure that the flax shall pass through to the feed mechanism in a relatively thin layer, the space between the guard and the trough being indicated by 88. Mounted in opposite ends of a frame 89, which also supports the guard 87, is a worm 90, the under side of which rotates slightly below the plane of the bottom of the trough 88, which is cut away for this purpose beneath the worm, as indicated at 88ª. This worm may be protected by a housing 91. Revolubly mounted in said frame above the worm is also a shaft 92 on the inner end of which is a gear 93, adjacent to which is a sprocket wheel 94, said gear and sprocket wheel being fast on the shaft. On the inner end of the worm 90 is a small gear 95, and between the gears 93 and 95 is an idler gear 96 which transmits motion from the former to the latter, said gear 96 being mounted on a stub shaft 97 secured to the frame 89. Mounted on a vertical frame member 98 (Fig. 6) is a bracket 99 which affords a bearing for a shaft 100, on opposite ends of which are mounted a relatively large sprocket wheel 101 and a relatively small sprocket wheel 102, respectively. A sprocket chain 103 passes around the sprocket wheels 94 and 102. On the shaft 51, before referred to, there is mounted a sprocket wheel 104, and a sprocket chain 105 passes around the sprocket wheels 104 and 101. The shaft 51, as before described, is driven from the main drive shaft 15, and through the medium of the connections last described the feed worm 90 is driven.

C indicates, generally, a threshing attachment which is shown in section in Fig. 10. The same comprises heads 106 suitably supported on the frame of the machine and in which are mounted corresponding sets of revoluble shafts 107, 108, having parallel relation and being located one above the other. Each of the shafts named has secured on opposite ends thereof a sprocket wheel 109, and a sprocket chain 110 is passed around the corresponding sprocket wheels of each pair of upper and lower shafts. Each pair of sprocket chains is connected at intervals by half round bars 111, the arrangement being such that in the travel of the sprocket chains 110, each bar of one chain will successively pass into the space between two bars of the opposite chain. The outer shafts 107 and 108 have each secured thereon a gear wheel 112 which are in mesh; and the shaft 107 is further provided with a sprocket wheel 113 (Fig. 1) over which, and over a sprocket wheel 114, on the shaft 51, a sprocket chain 115 passes. The arrangement of the sprocket chains and bars just described provides a horizontal space between the sprocket chains 110 in which the ends of the flax stalks containing the pods and seeds may be operated upon.

In operation the flax stalks, indicated by 116, are placed in the trough 86 and passed under the guard 87, whence they are immediately engaged by the feed worm 90, which operates not only to feed them forward, but also to separate them and prevent undue bunching of the stalks. As this feeding motion progresses the stalks will pass under the roller 76 and be engaged by the leather blocks 75, which will operate not only to feed them toward the decorticating devices, but likewise will clamp the stalks between them and the feed bar 59 and prevent lateral displacement thereof during the decorticating and threshing operation. As the stalks move under the action of the sprocket chain 73 toward the rear of the machine the outer end portions of the stalks, indicated by 117, containing the pods and seeds will pass between the two moving sprocket chains 110, the bars 111 whereof will operate to brush or pull the pods and seeds from the stalks. While this is going on the butt end of the stalks will have entered the space between the traveling bars of the forward decorticator A, and the tongues 40 of the upper set of bars will successively and progressively force the stalks down into the grooves of the complemental lower set of bars 41, which action, as will be more clearly apparent from Fig. 9, will result in bending the stalks in reverse directions and thereby crushing or breaking the outer husk or cuticle; and as the bars move outward toward the end of the stalks they brush or carry this crushed material with them, and this operation is repeated as the bars successively and rapidly act upon the stalks, the latter being firmly held or clamped between the leather blocks 75 and the feed bar 59, while at the same time being carried toward the rear of the machine by the movement of the blocks 75. As the decorticator A is inclined toward the line of feed, it follows that the stalks, as they are carried along, will also enter in between the revolving sets of bars so that a given length of the stalk, say two-thirds thereof, will be acted on by the forward decorticator. The stalks continue to pass toward the rear of the machine until their threshed ends will enter the space between the revolving sets of bars of the rear decorticator B, while at practically the same time the portion of the stalks which have been decorticated will pass between the blocks 85, and bar 76 of the second feed device, and be carried through the second decorticator after passing out of the first feed device. As the second decoricator B is inclined to extend across the line of feed of the first decorticator, said second decorticator will thus be permitted to act upon the portion of the stalks which was engaged by the feed device and not cleaned by the first decorticator. As the fiber passes out of the decorticator B and from between the feed bar 76 and traveling blocks 85 it may be collected or removed in any suitable manner.

It will be seen that I successively decorticate the flax from opposite ends. At the same time I provide for removing the pods and seeds from one end of the stalks before such end enters the second decorticator. The fiber, as it leaves the machine, is entirely clean, and is straight and untangled.

By providing a slight divergence between the chains of the decorticators from the inner to the outer sides, I thereby secure a gradual decrease in the severity of the decorticating action as the end portion of the flax projects farther and farther into the decorticator.

I claim:

1. In a machine for decorticating fibrous plants, a pair of decorticators, each comprising two revolving sets of parallel bars, said decorticators being inclined toward each other, and the front end of one being located substantially opposite the rear end of the other, and feed mechanism for conveying the material successively past the two decorticators.

2. In a machine for decorticating fibrous plants, a pair of decorticators, each comprising two revolving sets of parallel bars arranged to move in substantially parallel planes and having a tongue and groove relation, the one decorticator being located in advance of the other, and feed mechanism for conveying the material sidewise in a right line successively past the two decorticators.

3. In a machine for decorticating fibrous plants, a pair of decorticators, the one being located in advance of the other, a thresher located opposite the forward decorticator and in advance of the rear decorticator, and feeding mechanism for conveying material into and past said thresher and decorticators.

4. In a machine for decorticating fibrous plants, a pair of decorticators inclined toward each other, the one being located in advance of the other, a thresher located opposite the forward decorticator and in advance of the rear decorticator, and feeding mechanism for conveying the material sidewise and in a right line into and past said thresher and decorticators.

5. In a machine for decorticating fibrous plants, a pair of decorticators arranged to operate from opposite ends of the plant, feeding mechanism for conveying the material successively past the decorticators, each of said decorticators comprising two revolving sets of parallel bars arranged to move in substantially parallel planes and corresponding bars of the two sets having a superimposed tongue and groove relation, and driving mechanism therefor.

6. In a machine for decorticating fibrous plants, a pair of decorticators, the one located in advance of the other, a feeding device extending past the forward decorticator to a point intermediate the ends of the rear decorticator, a second feeding device located to one side of the first feeding device and extending from a point adjacent to the rear end of the first decorticator past the rear end of the second decorticator, a thresher located in advance of the rear decorticator with one of its sides substantially parallel with the first feeding mechanism, and driving means for the parts named.

7. In a machine for decorticating fibrous stalks, a pair of decorticators, combined holding and conveying mechanism for carrying the stalks past the decorticators, a support for the material to be treated, and a spiral feeding device operating in conjunction therewith to separate the stalks and feed them in a thin, even layer sidewise to said holding and conveying mechanism.

8. In a machine for decorticating fibrous stalks, a pair of decorticators, combined holding and conveying mechanism for carrying the stalks past said decorticators, a flat support for the material to be treated, and a spiral feeding device positioned slightly above said support and parallel thereto and operating in conjunction therewith to separate the stalks and feed them in a thin, even layer sidewise to the holding and conveying mechanism.

9. In a machine for decorticating fibrous stalks, a support for the material to be treated, a spiral feeding device operating in conjunction therewith, to separate the stalks and feed them in a thin, even layer sidewise, a pair of decorticators located the one in advance of the other, a pair of feeding devices for conveying the material successively past the two decorticators, one of said feeding devices having a forward end located adjacent to the said spiral feeding devices, and being adapted to receive the material therefrom.

10. In a machine of the class described, a decorticator comprising two series of parallel bars mounted to travel throughout a portion of their movement in juxtaposition and in the same direction, and at such time having superimposed relation, each bar of one set being provided with a longitudinal groove, and each bar of the other set being provided with a tongue adapted to enter the groove of the corresponding bar of the first set, and means for revolving the two sets of bars.

11. In a machine of the class described, a decorticator comprising two series of parallel bars mounted on endless carriers and traveling throughout a portion of their movement in juxtaposition and in the same direction, and at such time having superimposed relation, each bar of the lower set being provided with a longitudinal groove, and each bar of the upper set being provided with a tongue adapted to enter the groove of the corresponding lower bar, and means for revolving the two sets of bars.

12. In a machine of the class described, a decorticator comprising two revolving sets of complemental bars arranged to travel in juxtaposition and in the same direction through a portion of their movement, corresponding bars of the two sets having a superimposed tongue and groove relation, means for feeding material between said sets of bars and from one end to the other of the decorticator, and means for revolving the two sets of bars.

13. In a machine of the class described, a decorticator comprising two revolving sets of complemental bars arranged to travel in adjacent diverging planes through a portion of their movement, corresponding bars of the two sets having a tongue and groove relation, means for feeding material between said sets of bars and from one end to the other of the decorticator, and means for revolving the two sets of bars.

14. A decorticating device comprising two endless series of parallel, complemental bars having a tongue and groove relation, a plurality of the bars of each series occupying adjacent planes.

15. In a decorticator, a plurality of superimposed movable bars having a tongue and groove intermeshing relation.

16. A decorticating device comprising movable complemental members traveling in substantially parallel planes for a portion of their movement, said members having a tongue and groove relation.

17. A decorticating device comprising a plurality of movable complemental bars having a tongue and groove relation and traveling for a portion of their movement in substantially parallel planes.

18. In a decorticator, a combined holding and conveying mechanism comprising a stationary, longitudinally-grooved bar, and an endless series of yieldable contact-blocks having flat surfaces moving in contact with the grooved side of said bar.

19. In a decorticator, in combination with a flat support, a spiral feed operating in conjunction therewith to separate the bunched straws and form a relatively thin layer and to move them forward sidewise, and mechanism for receiving the separated straws, and for conveying them to and through the decorticator.

20. In a machine of the class described, a pair of decorticators, each of which comprises two revolving sets of parallel bars arranged to travel in adjacent parallel planes through a portion of their movement, corresponding bars of the two sets having a tongue and groove relation, said decorticators being oppositely inclined horizontally to the longitudinal median line of the machine, the forward decorticator having its inner end terminating substantially at said median line, and the rear decorticator having its rear portion projecting beyond such median line, and feeding mechanism moving in right lines past, and in proximity to, said decorticators, whereby the material in its passage from front to rear of the machine will progressively enter the respective décorticators successively from opposite ends.

21. In a machine for decorticating fibrous material, a pair of decorticators, the one located in advance of the other, a pair of feeding devices for conveying the material successively past the respective decorticators, a threshing device located to one side of the forward decorticator, one of said feeding devices being common to the forward decorticator and the threshing device, and driving mechanism for the parts named.

22. In a machine for decorticating fibrous material, a pair of decorticators, the one located in advance of the other, feeding mechanism for conveying the material successively past the respective decorticators, a threshing attachment located to one side of the forward decorticator and comprising two endless series of revolving parallel bars arranged to travel in the same direction and in a portion of their travel to move in adjacent parallel planes, said feeding mechanism being in part common to said threshing device and the forward decorticator.

23. In a machine of the class described, in combination with a decorticator, means for feeding the material to and through the same comprising a stationary longitudinally-grooved bar located at one side of and extending at least throughout the length of said decorticator, an endless carrier, and a series of yieldable contact-blocks mounted on said carrier and having flat working surfaces and arranged to travel throughout a portion of their movement with their flat surfaces in contact with said bar whereby to hold the material against lateral displacement, while at the same time carrying it bodily past the decorticator.

24. In a machine of the character described, in combination with a decorticator, means for feeding the material to and through the same comprising a grooved bar located to one side of said decorticating device and extending at least throughout the length thereof, an endless carrier, a series of yieldable contact-blocks mounted on said endless carrier and having flat working surfaces, a race-way extending parallel to said bar and in which said endless carrier moves whereby to force the flat surfaces of said blocks in their movement into contact with the grooved surface of said bar so that the material between the bar and blocks may be held against lateral displacement while being moved past the decorticator.

In testimony whereof, I have hereunto set my hand in presence of two subscribing witnesses.

WALTER J. HOLLIER.

Witnesses:
 BRUCE S. ELLIOTT,
 STELLA HILL.